Oct. 11, 1960  E. S. CARTER, JR  2,955,779
ACTUATING MECHANISM DAMPING CONTROL
Filed Sept. 29, 1955  3 Sheets-Sheet 2

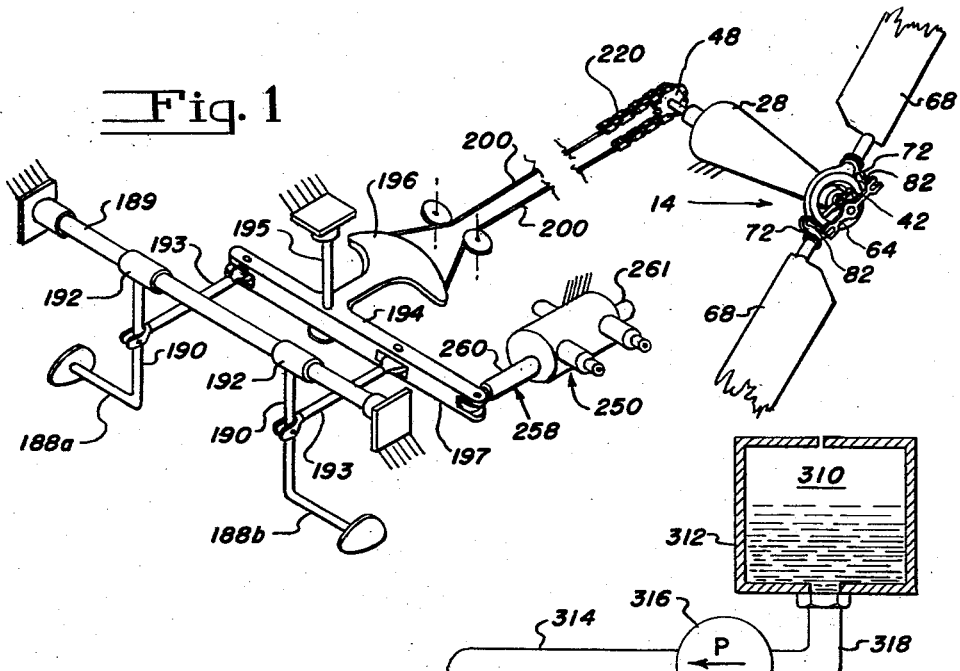

INVENTOR
EDWARD S. CARTER, JR.
BY
AGENT

Oct. 11, 1960   E. S. CARTER, JR   2,955,779
ACTUATING MECHANISM DAMPING CONTROL
Filed Sept. 29, 1955   3 Sheets-Sheet 3

INVENTOR
EDWARD S. CARTER JR.
BY Jack N. McCarthy
AGENT

United States Patent Office

2,955,779
Patented Oct. 11, 1960

2,955,779

ACTUATING MECHANISM DAMPING CONTROL

Edward S. Carter, Jr., Fairfield, Conn., assignor to United Aircraft Corporation, East Hartford, Conn., a corporation of Delaware Filed Sept. 29, 1955, Ser. No. 537,443

16 Claims. (Cl. 244—17.21)

This invention relates to a damping control and particularly to the pedal actuating mechanism of a helicopter.

An object of this invention is to provide a pedal damping control to prevent rapid movement of the pedal actuating mechanism which may place excessive forces on other parts of the helicopter, especially the tail rotor pylon.

A further object of this invention is to provide resistance to any movement of the pedals by the pilot in a system where servo controls are used, thereby providing an artificial feel.

A further object of this invention is to provide a damping control which will permit free movement of the pedals if a failure of hydraulic pressure within an aircraft occurs.

Another object of this invention is to provide a damper which will permit the pedal controls to move initially in response to an application of force by means of a spring.

A still further object of this invention is to provide a pedal damping control which will have a force time responsive to a displacement of the pedal similar to the time response of the helicopter's yawing acceleration resulting from this change of pedal and control surface position.

A yet further object of this invention is to provide a pedal damping control having linkage, the adjustment of which may be altered so as to require a given maximum pedal force to correspond with the given maximum yawing acceleration which can be tolerated by any particular helicopter in view of its structural design considerations.

An additional object of the invention is to provide positioning means between the pedal damping control unit and the collective pitch control so that a corrective pitch change will be applied to the tail rotor when the torque generated by the main rotor is altered by a change in position of the collective pitch stick.

A yet additional object of this invention is to provide means in the pedal damping control unit so that the collective pitch stick can be moved independently of the tail rotor pitch control in the event of dead engine autorotative landing.

A still additional object of this invention is to provide a pedal damping means particularly suited to restrain the "open loop" operation of a gyro stabilization system in that a degree of anticipation results.

These and other objects and advantages of the invention will be evident from the following detailed description of a preferred embodiment of the invention shown in the accompanying drawings or will be pointed out hereinafter.

In these drawings:

Fig. 1 shows a pedal actuating mechanism connected to the pitch changing mechanism of a tail rotor.

Fig. 2 is a schematic view of the damping device.

Figure 6:
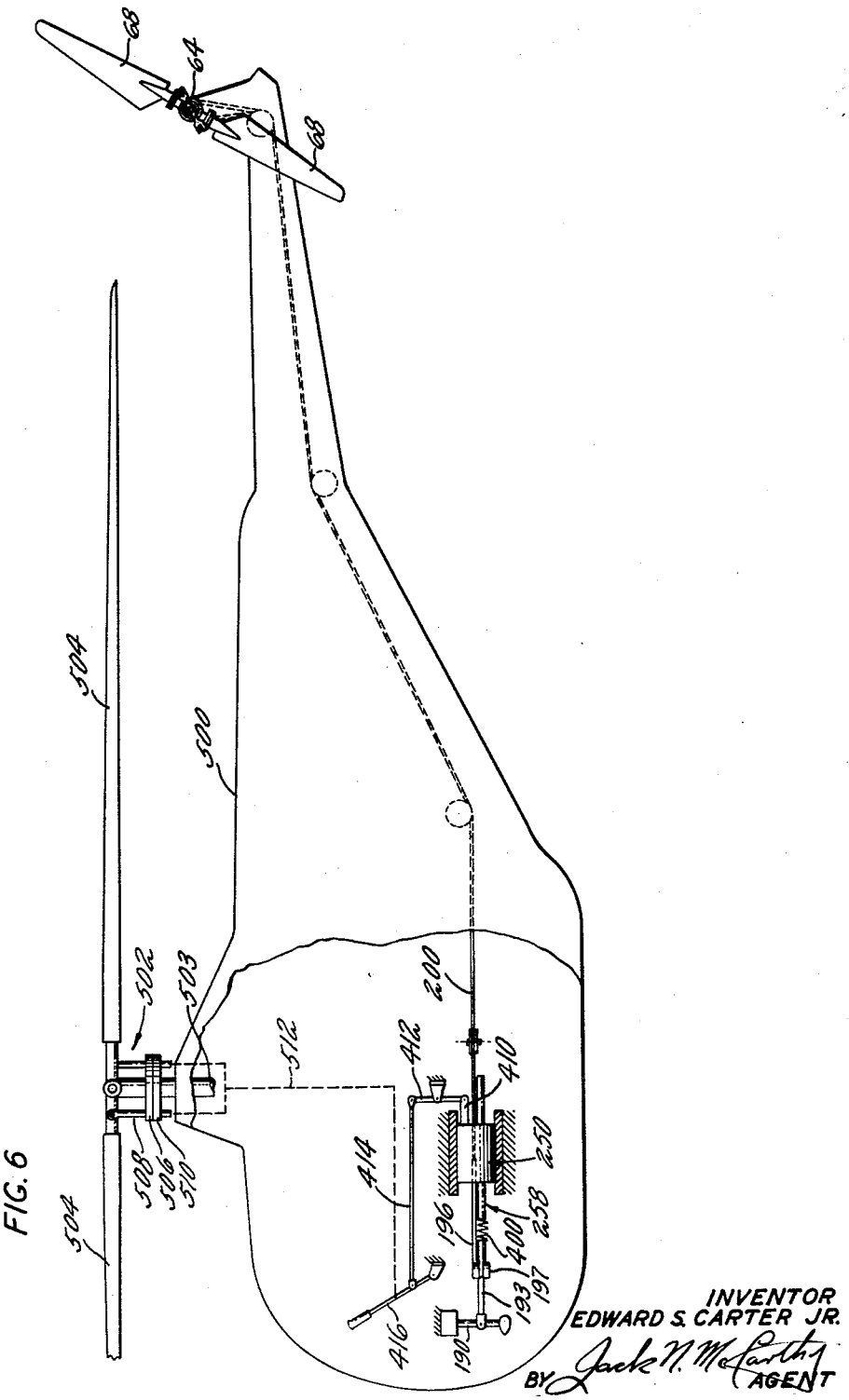
Fig. 6 is a diagrammatic view of a helicopter showing the damping device connected to the collective pitch stick.

Fig. 6 shows a conventional helicopter 500 having a rotor 502 driven by a rotor shaft 503. Rotor 502 includes rotor blades 504. which blades are mounted for pitch changing movement. An upper swash plate 506 is connected to the pitch horn of each blade by a connecting link 508. A lower swash plate 510 is connected to the collective pitch stick 416 by linkage 512. The specific construction of the body of the helicopter, pitch changing mechanism and rotor does not form part of this invention, so these are shown in schematic form. Specific representations of these parts of the helicopter are shown in U.S. application Serial No. 741,531, filed June 12, 1958, as a continuation of application Serial No. 372,265, filed August 4, 1953, to Walter Gerstenberger et al. for a Gyro Stabilizer for a Helicopter, now abandoned.

As shown in Fig. 1 the pedal actuating mechanism is connected to the pitch changing mechanism of a tail rotor 14. A similar pedal actuating mechanism is shown in United States application Serial No. 741,531, referred to above (see Fig. 9 and Fig. 9a).

The pedal actuating mechanism includes the pilot's pedals 188a and 188b pivotally mounted on a fixed horizontal shaft 189 by arms 190, one each extending from a separate rotatable sleeve 192 positioned around said horizontal shaft. An actuating rod 193 is pivoted at one end to each arm 190. Each rod 193 extends rearwardly from its arm 190. The rearward end of each rod 193 is pivoted to an actuating bar 194. This actuating bar is pivotally mounted midway between said pivotal connections to a vertically fixed shaft 195. Said actuating bar has extending rearwardly therefrom a cable segment 196. Each end of the cable segment 196 is connected to a cable 200 which is connected to the actuating chain 220 of the tail rotor pitch changing mechanism. While each cable 200 may be directly connected to a separate end of the chain 220, a servo actuating mechanism 440 such as shown in Fig. 10 of United States application Serial No. 741,531 referred to above may be inserted in the cable attachment (see Fig. 3).

The tail rotor 14 may be driven by conventional drive means which extends aft through the tail cone, tail rotor pylon and housing 28 which is maintained in a fixed position. Conventional drive means and a pitch changing mechanism similar to that shown in this application is disclosed in United States application Serial No. 411,375, filed February 19, 1954, to Igor I. Sikorsky for a Tail Rotor Counterweight, now Pat. No. 2,795,284.

The chain 220 extends around a sprocket 48 which when rotated imparts an "in" or "out" motion to a pitch control rod 42. This motion is in turn imparted to the pitch changing beam 64. Each tail rotor blade 68 is journalled in bearings for pitch changing movement about its longitudinal axis. Each blade has a horn 72 which projects therefrom for imparting pitch change to each of the blades. The free end of one horn 72 is attached to one free end of the pitch changing beam 64 by a link 82 while the other horn 72 is attached to the other end of pitch changing beam 64 by another link 82. Therefore, it can be seen that as the pitch control rod 42 moves outwardly from housing 28, the tail rotor blades 68 will be rotated in one direction around their axes, and when the pitch control rod 42 is moved in an opposite direction into the housing 28, the blades 68 will be rotated in the opposite direction around their axes.

The actuating bar 194 has an extension 197 on one end thereof and the free end of said extension is connected to a damping device 250.

Figure 4:
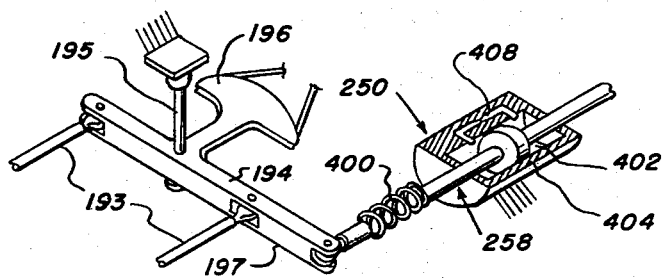
Fig. 4 is a schematic cut-away in part showing a basic embodiment of the pedal actuating mechanism of this invention installed in the mechanism of Fig. 1.

While a more complete description of the now preferred embodiment of this damping device 250 will follow hereinafter, the essential units of a basic damping device are shown in Fig. 4.

Figure 3:
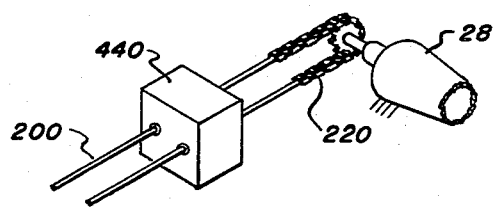
Fig. 3 is a schematic view showing a servo actuating mechanism connected in the cable attachment.

As seen in this figure, a spring 400 and a damper 402 are provided in series connected to the extension 197 of the actuating bar 194 of the tail rotor pitch control mechanism of Fig. 1. The advantages of such a spring damping series applied to artificial feel of yaw pedal control of a helicopter with irreversible servos, such as shown in Fig. 3, will be apparent from the following description:

It can be shown that the response during hover of a single rotor helicopter in yaw to a correction of the tail rotor control can be approximated by the following relationship:

$$\frac{\ddot{\Psi}}{\Theta} = \frac{K_1 P}{\tau P + 1}$$

Where $\ddot{\Psi}$ is angular acceleration,
$\Theta$ is control blade angle,
$K_1$ is a sensitivity factor,
$P$ is the Laplace operator conventionally used in describing dynamic transfer functions, and
$\tau$ is the characteristic time of the yaw response of the helicopter dependent on aerodynamic and inertial characteristics of the design.

This acceleration is an indication of the stress imposed on the tail cone. It can similarly be derived that the force reacted on a pilot's foot, F, to accomplish a change in blade angle, $\theta$, reacting against the spring damper mechanism of Fig. 1, can likewise be described by a dynamic transfer function as follows:

$$\frac{F}{\Theta} = \frac{cK_2 P}{\frac{c}{k}P + 1}$$

where $K_2$ is a sensitivity factor depending upon linkage ratios and $c$ and $k$ are the damping and spring characteristics defined above. The spring 400 is of stiffness $k$ lb./in. and the damper 402 has damping characteristics $c$ lb./in./sec. The body 404 of damper 402 in turn is attached to structure as shown in Fig. 4.

A comparison of these two transfer functions shows that by proper choice of the parameters, $c$ and $k$, the time response of the force on the pedal may be made identical to the yaw response of the helicopter with any given time constant, $\tau$. It then becomes possible to apportion the linkage ratio K so as to require a given maximum pedal force to correspond with a given maximum acceleration which a particular helicopter will tolerate for structural design considerations.

The advantages of this type of restraining means can be appreciated from the following operation of the device as shown in Fig. 4. Any movement to alter pitch of the tail rotor will manifest itself as a movement of the actuating bar 194 and hence the extension 197. In response to an effort of the pilot to accomplish this, the spring 400 must be compressed. Inasmuch as the stiffness $k$ of this spring can be of any desired amount, the pilot will feel a corresponding amount of restraint in the pedals. Movement against this spring will, of course, change the tail rotor pitch as previously described. If the pilot holds a steady pedal position, he will feel a lessening amount of restraint as the force of spring 400 causes the damper 402 to bleed off through orifice 408. Thus, the pilot need not hold a steady pedal force for a given steady flight condition as the spring force opposing him is gradually reduced to zero.

By choosing the proper damping characteristics $c$, the resistance against the pilot will diminish in direct proportion to the yawing movement of the helicopter as it asymptotically approaches and settles out at a steady rate of turn. This spring resistance provides additionally for the "feel" in the controls which the addition of servo control mechanisms eliminates, and furnishes the pilot with a true facsimile of the acceleration force being imparted to the aircraft by the tail rotor.

After establishing a steady turning velocity as in a hovering turn, the pedal spring 400 is recentered so as to restrain decelerations as well as accelerations. A damper by itself strong enough to prevent pedal corrections from overstressing the tail cone would have to be excessively stiff to allow small corrections comfortably. A spring by itself providing a centering force requires that the pilot hold a steady force for any change in steady flight condition, and also can act to aggravate stress problems in decelerations and steady turns.

A now preferred embodiment of the damping device made up by the spring 400 and damper 402 in series is shown in Fig. 2 and consists of a damping device 250 which comprises a housing 252 with a bore 254 located therein. Mounted for reciprocation in said bore is a piston 256. A piston rod 258 is fixed to and mounted coaxially with the piston 256 and extends from said piston on both sides thereof.

The forward part 260 of the piston rod extends forwardly through the housing 252 to the exterior thereof and is connected at its free end to the free end of extension 197. The other part 261 of the piston rod extends rearwardly through the housing 252 to the exterior thereof.

The portion of the bore 254 to the rear of piston 256 forms a chamber 255 with the face 257 of said piston and is connected to the portion of the bore 254 forward of piston 256 which forms a chamber 259 with the face 263 of said piston, by passageways 262, 264 and 266. A restriction 268 having an orifice 270 therein is located in passageway 264 for a purpose to be hereinafter described. Said restriction is removable and may be replaced by restrictions having different size orifices. A screen or filter member 272 is positioned in said passageway 264 on each side of said restriction 268.

Chamber 255 of the bore 254 is connected at its rearward end to one end of a cylinder 274 by a passageway 276. Located within said cylinder for slidable engagement therewith is a free piston 278. The other end of cylinder 274 has a check valve 280 therein which permits entry into said cylinder.

Chamber 259 of the bore 254 is connected at its forward end to one end of a cylinder 282 by a passageway 277. Located within said cylinder for slidable engagement therewith is a free piston 284. The other end of cylinder 282 has a check valve 286 therein which permits entry into said cylinder. The check valves 280 and 286 perform as normal check valves. Free pistons 278 and 284 correspond to the spring 400 shown and described in connection with Fig. 4.

Chamber 255 is connected to one side of a double acting check valve 288 by passageways 262 and 290. Chamber 259 is connected to the other side of said check valve 288 by passageways 266 and 292. Double acting check valve 288 has a valve seat 294 open to a chamber 295 which is connected to passageway 290 and a valve seat 296 open to a chamber 297 which is connected to passageway 292. A bore 298 connects these valve seats. A ball 300 is located in chamber 295 for engagement with valve seat 294 to provide a valve action therebetween and a ball 302 is located in chamber 297 for engagement with valve seat 296 to provide a valve action therebetween. These balls 300 and 302 are connected by a stem which is longer than bore 298 thereby preventing both balls from being seated at the same time.

Radial passages 304 extend outwardly from said bore 298 and are connected at their outer ends by an annulus 306. Annulus 306 is connected to the exterior of housing 252 by a passageway 308. Passageway 308 is connected to a fluid supply 310, located in a tank 312, by a conduit 314, pump 316 and conduit 318 for a purpose to be hereinafter described.

Located within both parts 260 and 261 of the piston rod 258 and extending through the center of piston 256 is a bore 320. A passageway 322 connects chamber 259 to said bore and passageway 324 connects chamber 255 to said bore. A plunger 326 is slidably mounted within said bore. Said plunger is formed having two lands 328, 330 engaging said bore. These lands have an annulus 332 located therebetween while a section 334 of reduced diameter extends forwardly from land 328. A passageway 336 extends from the forward end of the plunger 326 to the side of the land 330 where it engages the bore 320. Stop 338 is provided in bore 320 to limit the forward movement of said plunger. A spring 340 is provided between the rearward end of the bore 320 and the rearward face of the plunger 326 which tends to bias said plunger toward the stop 338. An opening 342 connects the rear end of bore 320 to the atmosphere.

To place the damping device 250 in condition for operation the free pistons 278 and 284 are preloaded with a predetermined air pressure through check valves 280 and 286 respectively. The pump 216 is then turned on to deliver a predetermined pressure to the internal system of the damping device. The pressure enters the housing and passes into the system through the double acting check valve 288. As the pressure in the system builds up to the desired amount, the plunger 326 moves to the position shown in Fig. 2 in accordance with the difference in pressure acting on said plunger thereby compressing spring 340. In this position passageway 322 is not connected to passageway 324. It can be seen that if a failure results from loss of hydraulic pressure in the system, the spring 340 would force plunger 326 to its forward position against stop 338 thereby connecting passageway 322 to 324 through passageway 336 permitting the piston rod to move freely.

*Operation*

When the pilot desires to change the pitch of the tail rotor blades 68 in one direction, he applies pressure to the proper pedal 188 which rotates the sprocket 48 to move the pitch changing beam in the proper direction.

As the actuating bar 194 moves about shaft 195, it tends to move piston rod 258 of the damping device 250 in one direction or the other. For example, let us assume that the pilot moves pedal 188a in the forward direction thereby rotating the actuating bar 194 in a counterclockwise direction. As viewed in Fig. 2, this would move the piston rod 258 to the right. It can be seen that a steady light or medium force applied to the piston rod 258 will meet with a steady light resistance provided by restriction 268. The speed of movement of the piston rod 258 will depend upon the size of the orifice 270 in restriction 268. In the event a heavy force tends to move piston rod 258, the air charged pistons in the cylinders 274 and 282 will come into action. The action of these pistons in their cylinders permits the piston rod 258 to move an amount proportional to the force, thus providing the spring action described above. As the piston rod 258 and piston 256 move to the right, the piston 278 compresses the air in the cylinder 274 between the piston and check valve 280.

If a pilot moves pedal 188b in the forward direction, the actuating bar 194 would be rotated in a clockwise direction and this would move the piston rod 258 to the left, as viewed in Fig. 2. It can be seen that the damping action in this case is the same as for movement of pedal 188a except in the opposite direction. In this instance, if a heavy force tended to move piston rod 258, the piston 284 would compress the fluid in the cylinder 282 to permit the piston rod 258 to move faster.

It can be seen that in operation a loss of fluid pressure in the system would permit spring 340 to move plunger 326 to the left against stop 338 thereby connecting one side of the piston 256 directly with the other side permitting free movement of the piston rod 258.

Figure 5:
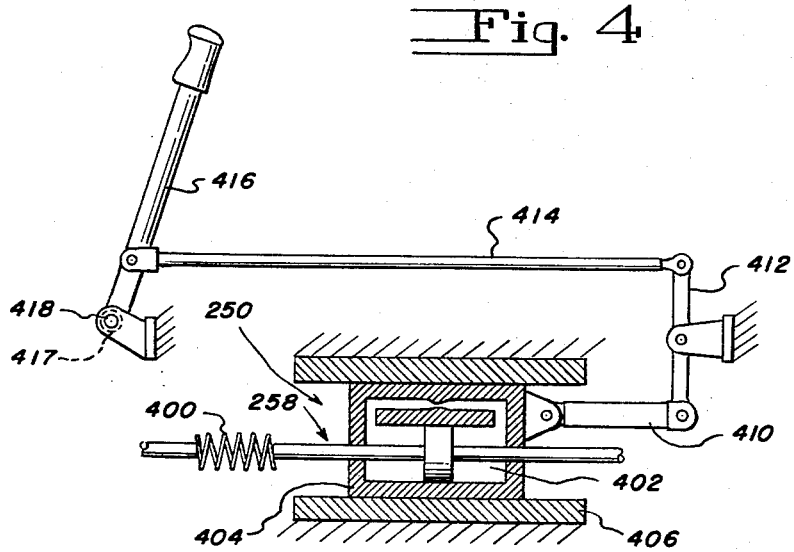
Fig. 5 is a diagrammatic view of an additional control imposed on the pedal actuating mechanism.

The pedal damping unit of this invention is useful also in the field of providing automatic control of a helicopter under certain conditions. Normally, when flying in a steady course or hovering, very little alteration of the tail rotor pitch setting is necessary because the torque generated by the main rotor is constant. However, when the main rotor power is changed, as during climbs, descents, landings or take-offs, the tail rotor also must be corrected. Over a prolonged period this operation can be fatiguing and various automatic controls have been proposed, most of which are either costly or inaccurate. The present device lends itself neatly to providing the necessary tail rotor corrections as shown in Fig. 5, whether or not additional automatic controls are used.

A damping device having a spring 400 and damper 402 in a case 404 similar to that shown in Fig. 4 is mounted so that the case is reciprocable in ways 406 attached to the airframe. Connected to the back of case 404 is a link 410 connected in turn to the lower end of a crank 412. Crank 412 pivots about its midpoint where it is carried by the airframe and has a link 414 connected to its upper end. Link 414 connects to collective pitch stick 416 intermediate its upper end. Torque tube 417 to which the lower end of the stick is attached rotates about pin 418. A collective pitch stick of this nature and the manner in which it controls the main rotor pitch is shown in Fig. 12 of U.S. Patent No. 2,599,690.

If it is desired to change the tail rotor pitch by the usual method of actuating the pedals, the device works exactly as before described in connection with Fig. 4. If the main rotor torque is altered by manipulation of the collective pitch stick, the linkage composed of link 414, crank 412 and link 410 will move damper case 404 in the ways 406. Due to the restriction provided by orifice 408, the damper 402 will be forced to move nearly bodily with the case 404. This will in turn compress spring 400 to exert a force back into the tail rotor pitch control linkage. If the pilot does not resist the movement of the pedals caused by this spring force, the control linkage will move to effect the tail rotor pitch setting in a manner discussed hereinbefore. Under certain circumstances, this automatic compensation might not be desired; however, at all times the pilot can overcome it by resisting the spring force feeding back into his pedals. In the event of engine failure when this correction is not desired, the loss of hydraulic pressure arising from the fact that the hydraulic pump may be engine driven results in opening the bypass so that the hydraulic fluid would be allowed to circulate freely in the damper 402 as discussed previously in connection with the preferred embodiment shown in Fig. 2, and the damper case 404 would therefore move freely in relation to the damper 402 and the ways 406 in response to any actuation of the collective pitch control.

Thus, it can be seen that this invention provides a device that operates in a servo motor control system and provides artificial "feel," prevents an excessive force from being imposed on the structure of the aircraft thereby permitting the use of lighter structure, and exerts a controlled amount of automatic compensation on the tail rotor pitch in response to changes in the torque generated by the main rotor.

This invention also has particular utility when coupled with a gyro stabilization system such as is shown and described in United States application Serial No. 741,531, referred to above. As discussed in this application, the automatic control system in yaw goes into "open loop" operation under certain circumstances. When this is called for some restraint is required to prevent full travel instantaneously. The damper of this invention may be used in this system as shown in Fig. 1 so that the pedals drift off slowly in response to an "open loop" force. When reacted by this damper the drift is preceded by a small displacement proportional to the "open loop" force. This in effect anticipates the drift and provides for more stable automatic stabilization system behavior.

Although a specific pedal damping control has been shown and described herein for purpose of illustration, it will be evident to those skilled in the art that the invention is capable of various modifications and adaptations within the scope of the appended claims.

I claim:

1. In a helicopter, a main rotor, means for collectively changing the pitch of the blades of said main rotor, means for controlling the yaw attitude of said helicopter, first means for actuating the collective pitch means, second means for actuating said yaw attitude controlling means, first pilot operated means for moving said first actuating means, second pilot operated means for moving said second actuating means, restraining means connected to said second pilot operated means for restraining its action on its associated controlling means, and means interconnecting said first pilot operated means with said restraining means for introducing corrections therethrough required by changes in collective pitch for said yaw attitude controlling means.

2. In a helicopter, a main rotor, means for collectively changing the pitch of the blades of said main rotor, means for controlling the yaw attitude of said helicopter, first means for actuating the collective pitch means, second means for actuating said yaw attitude controlling means, first pilot operated means for moving said first actuating means, second pilot operated means for moving said second actuating means, restraining means connected to said second pilot operated means for restraining its action on its associated controlling means, said restraining means comprising a damper, and means interconnecting said first pilot operated means with said restraining means for introducing corrections therethrough required by changes in collective pitch for said yaw attitude controlling means, said interconnecting means including a connection which moves said damper along its longitudinal axis with a movement of said first pilot operated means.

3. In a helicopter, a main rotor, means for collectively changing the pitch of the blades of said main rotor, means for controlling the yaw attitude of said helicopter, first means for actuating the collective pitch means, second means for actuating said yaw attitude controlling means, first pilot operated means for moving said first actuating means, second pilot operated means for moving said second actuating means, restraining means for restraining the action of said second pilot operated means on its associated controlling means, said restraining means comprising a damper, said damper comprising a piston mounted in a cylinder with the movement of the piston being governed by flow restriction means, a piston rod connected to said piston and extending to the exterior of said cylinder, said piston rod being connected to said second pilot operated means, and means interconnecting said first pilot operated means with said restraining means for introducing corrections therethrough required by changes in collective pitch for said yaw attitude controlling means, said interconnecting means including a connection for increasing the pressure of the fluid within the damper on one side of said piston with a movement of said first pilot operated means.

4. In a helicopter, a main rotor, means for collectively changing the pitch of the blades of said main rotor, means for controlling the yaw attitude of said helicopter, first means for actuating the collective pitch means, second means for actuating said yaw attitude controlling means, first pilot operated means for moving said first actuating means, second pilot operated means for moving said second actuating means, restraining means for restraining the action of said second pilot operated means on its associated controlling means, said restraining means comprising a damper, said damper comprising a piston mounted in a cylinder with the movement of the piston being governed by flow restriction means, a piston rod connected to said piston and extending to the exterior of said cylinder, said piston rod being connected to said second pilot operated means, and means interconnecting said first pilot operated means with said restraining means for introducing corrections therethrough required by changes in collective pitch for said yaw attitude controlling means, said interconnecting means including a connection which moves said cylinder in one direction or the other along its longitudinal axis with a movement of said first pilot operated means.

5. In a helicopter, a main rotor, means for collectively changing the pitch of the blades of said main rotor, means for controlling the yaw attitude of said helicopter, first means for actuating the collective pitch means, second means for actuating said yaw attitude controlling means, first pilot operated means for moving said first actuating means, second pilot operated means for moving said second actuating means, restraining means for restraining the action of said second pilot operated means on its associated controlling means, said restraining means comprising spring means and a damper, said damper consisting of a piston mounted in a cylinder with the movement of the piston being governed by flow restriction means, a piston rod connected to said piston and extending to the exterior of said cylinder, said piston rod being connected to said second pilot operated means, said spring means permitting said second pilot operated means to move a predetermined amount without opposing the effect of said damper, and means interconnecting said first pilot operated means with said restraining means for introducing corrections therethrough required by changes in collective pitch for said yaw attitude controlling means, said interconnecting means including a connection which increases the pressure of the fluid within the damper on one side of said piston with a movement of said first pilot operated means.

6. In a helicopter, a main rotor, means for collectively changing the pitch of the blades of said main rotor, means for controlling the yaw attitude of said helicopter, first means for actuating the collective pitch means, second means for actuating said yaw attitude controlling means, first pilot operated means for moving said first actuating means, second pilot operated means for moving said second actuating means, restraining means for restraining the action of said second pilot operated means on its associated controlling means, said restraining means comprising spring means and a damper, said damper consisting of a first piston mounted in a first cylinder with the movement of the piston being governed by flow restriction means, a piston rod connected to said piston and extending to the exterior of said cylinder, said piston rod being connected to said second pilot operated means, said spring means comprising a second cylinder having its interior connected to the interior of said first cylinder on one side of said piston and a third cylinder having its interior connected to the interior of said first cylinder on the other side of said piston, each of said second and third cylinders having a piston therein biased toward the end having the connection with the interior of said first cylinder, and means interconnecting said first pilot operated means with said restraining means for introducing corrections therethrough required by changes in collective pitch for said yaw attitude controlling means, said interconnecting means including a connection which increases the pressure of the fluid within the damper on one side of said piston with a movement of said first pilot operated means.

7. In a helicopter, means for controlling the yaw attitude of said helicopter, means for actuating said controlling means, pilot operated means for moving said actuating means, and restraining means connected to said pilot operated means for restraining its action on the controlling means to prevent overstressing of structural members of the helicopter, said restraining means comprising spring means and a damper, said damper comprising a first piston mounted in a first cylinder with the movement of the piston being governed by flow restriction means, a piston rod connected to said first piston and extending to the exterior of said cylinder, said piston rod being connected to said pilot operated means, said spring means comprising a second cylinder having its interior connected to the interior of said first cylinder on one side of said first piston and a third cylinder having its interior connected to the interior of said first cylinder on the other side of said first piston, each of said second and third cylinders having a piston therein biased toward the end having the connection with the interior of said first cylinder.

8. In a helicopter, means for supplying a hydraulic pressure, means for controlling the yaw attitude of said helicopter, means for actuating said controlling means, pilot operated means for moving said actuating means, restraining means connected to said pilot operated means for restraining its action on the controlling means to prevent overstressing of structural members of the helicopter, said restraining means comprising spring means and a damper, said damper comprising a piston mounted in a cylinder with the movement of the piston being governed by flow restriction means connecting one side of said piston to the other, a piston rod connected to said piston and extending to the exterior of said cylinder, said piston rod being connected to said pilot operated means, both ends of said cylinder being connected to said means for supplying a hydraulic pressure, and means for bypassing said flow restriction means when said hydraulic pressure falls below a predetermined value.

9. A restricting device comprising a housing, a first bore located therein, a piston mounted for movement in said first bore, a piston rod extending from said piston to the exterior of said housing, a first passageway connecting the first bore on one side of said piston to the other side of said piston, restricting means in said first passageway, a second bore located in said piston rod and piston, a second passageway connecting the first bore on one side of said piston to said second bore, a third passageway connecting the first bore on the other side of said piston to said second bore, plunger means in said second bore, said plunger means having a passageway therein, said plunger means being movable in said second bore, said plunger means in one position in said bore connecting said second passageway to said third passageway, said plunger means in another position disconnecting said second passageway from said third passageway.

10. A restricting device comprising a first housing, a bore located therein, a piston mounted for movement in said bore, a rod extending from said piston to the exterior of said first housing, a passageway connecting the bore on one side of said piston to the other side of said piston, restricting means in said passageway, a second housing having a second bore, means operatively connecting one end of said second bore to said first bore on one side of said piston, a second piston in said second bore, said piston being biased toward the end connected to said first bore, a third housing having a third bore, means operatively connecting one end of said third bore to said first bore on the other side of said piston, a third piston in said third bore, said piston being biased toward the end connected to said first bore.

11. A restricting control device having spring means and a damper, said damper comprising a first piston mounted in a first chamber, flow restriction means connected to said damper for governing the movement of said first piston, a piston rod connected to said first piston and extending to the exterior of said chamber, said spring means comprising a second chamber having its interior connected to the interior of the first chamber on one side of said first piston and a third chamber having its interior connected to the interior of said first chamber on the other side of said first piston, each of said second and third chambers having a piston therein, each piston having biasing means for biasing it toward the end of its chamber having the connection with the interior of said first chamber.

12. A restricting control device having spring means and a damper, said damper comprising a first piston mounted in a first chamber, flow restriction means connected to said damper for governing the movement of said first piston, a piston rod connected to said first piston and extending to the exterior of said chamber, said spring means comprising a second chamber having its interior connected to the interior of the first chamber on one side of said first piston and a third chamber having its interior connected to the interior of said first chamber on the other side of said first piston, each of said second and third chambers having a piston therein, means for biasing each of said last named pistons toward the end of its chamber having the connection with the interior of said first chamber, and means for varying the biasing force of said biasing means.

13. A restricting control device having spring means and a damper, said damper comprising a first piston mounted in a first chamber, flow restriction means operatively connected to said damper for governing the movement of the piston, a piston rod connected to said first piston and extending to the exterior of said chamber, said spring means comprising a second chamber having its interior connected to the interior of the first chamber on one side of said first piston and a third chamber having its interior connected to the interior of said first chamber on the other side of said first piston, each of said second and third chambers having a piston therein biased toward the end having the connection with the interior of said first chamber, means operatively connected to said first chamber for supplying a hydraulic pressure to said first chamber, and means operatively connected to said damper for bypassing said flow restriction means when said hydraulic pressure falls below a predetermined value.

14. A restricting control device having spring means and a damper, said damper comprising a first piston mounted in a first chamber, flow restriction means connected to said damper for governing the movement of said first piston, a piston rod connected to said first piston and extending to the exterior of said chamber, a passageway connecting one side of said first piston to the other side, means operatively connected to said first chamber for maintaining a fluid pressure in said first chamber, a valve in said passageway, said valve closing off said passageway when said fluid pressure is at a predetermined pressure, said valve being placed in an open position when said fluid pressure has dropped below a predetermined value thereby opening said passageway.

15. In a helicopter, a main rotor, a tail rotor, means for collectively changing the pitch of the blades of said main rotor, means for controlling the pitch of the blades of said tail rotor, first means for actuating the collective pitch means, second means for actuating said controlling means of said tail rotor, first pilot operated means for moving said first actuating means, second pilot operated means for moving said second actuating means, restraining means connected to said second pilot operated means for restraining its action on its associated controlling means, and means interconnecting said first pilot operated means with said restraining means for introducing corrections therethrough required by changes in collective pitch for said tail rotor control means.

16. A helicopter comprising, means for controlling the yaw attitude of said helicopter, means for actuating said controlling means, pilot operated means for moving said actuating means, said helicopter having a yaw response time constant equal to $\tau$, and restraining means connected to said pilot operated means for restraining its action on the controlling means to prevent overstressing of structural members of the helicopter, said restraining means comprising spring means and a damper, said damper comprising a piston mounted in a cylinder with the movement of the piston being governed by flow restriction means, a piston rod connected to said piston and extending to the exterior of said cylinder, said piston rod being connected to said pilot operated means, said spring permitting said pilot operated means to move a predetermined amount without opposing the effect of said damper, said restraining means having its spring means and damper connected to said pilot operated means in which:

$$\frac{c}{k} = \tau$$

where:

$c$ = damping characteristic of the damper and
$k$ = stiffness of the spring.

References Cited in the file of this patent
UNITED STATES PATENTS

| | | |
|---|---|---|
| 1,909,450 | Bleecker | May 16, 1933 |
| 2,628,044 | Johnson | Feb. 10, 1953 |
| 2,638,289 | McKellar | May 12, 1953 |